United States Patent [19]
Neill

[11] 3,777,240
[45] Dec. 4, 1973

[54] THERMOSTAT CHATTER PROTECTION FOR REFRIGERATION COMPRESSOR MOTORS
[75] Inventor: Donald E. Neill, Liverpool, N.Y.
[73] Assignee: Carrier Corporation, Syracuse, N.Y.
[22] Filed: Sept. 21, 1972
[21] Appl. No.: 290,925

Related U.S. Application Data
[63] Continuation of Ser. No. 188,275, Oct. 12, 1971, abandoned.

[52] U.S. Cl. ................. 318/471, 317/13 B, 62/158
[51] Int. Cl. ............................................. H02h 7/08
[58] Field of Search .......................... 318/471, 472; 317/13 R, 13 B; 62/158

[56] References Cited
UNITED STATES PATENTS
3,064,444   11/1962   Kyle .................................. 317/13 R
3,312,081   4/1967    Berger et al. .................. 318/472 X
3,559,420   2/1971    Lipscomb ....................... 318/472 X
3,660,718   5/1972    Pinckaers ......................... 317/13 B Primary Examiner—Benjamin Dobeck
Attorney—J. Raymond Curtin

[57]         ABSTRACT
The motor of a reciprocating refrigeration compressor is provided with a motor control and protection system, which includes means for preventing the contacts of the motor relay from welding or otherwise being damaged by vibration of the system thermostat. The motor relay is energized or de-energized by a solid state switch, which is controlled by two or more trip circuits in response to a condition of operation of the system. A current sensor provides a signal proportional to motor current which is summed with an opposite polarity reset signal and integrated to provide a signal to a first trip circuit. The room thermostat contacts close in response to a demand for refrigeration and provide a current through the switch means to energize the relay. When the thermostat contacts stay open for a short period of time, the open circuit voltage across them is integrated and eventually trips a second trip circuit which actuates the switch means to a nonconducting condition, thereby de-energizing the relay and preventing damage to the relay contacts. A feedback circuit raises the output of the integration circuit and decreases the trip threshold of the first trip circuit to trip the first trip circuit, whereby a period of time must elapse while the reset signal is integrated to the reset level before the relay contacts can be closed again. If the contact chatter lasts only a very short time, the signal due to integrating the voltage across them will not be sufficient to cause an unnecessary trip.

5 Claims, 2 Drawing Figures

INVENTOR
DONALD E. NEILL
BY
Frank N. Decker Jr.
ATTORNEY

3,777,240

THERMOSTAT CHATTER PROTECTION FOR REFRIGERATION COMPRESSOR MOTORS

This is a continuation, of application Ser. No. 188,275, filed Oct. 12, 1971, now abandoned.

CROSS REFERENCE TO RELATED APPLICATION

This application discloses features of the motor protection and control which are the subject of my copending application, Ser. No. 188,286 filed Oct. 12, 1971 now U.S. Pat. No. 3,721,880.

BACKGROUND OF THE INVENTION

It is customary practice to connect and disconnect the electric motor of a refrigeration compressor from the main power line by means of a relay. A problem is frequently encountered due to vibration or chattering of the room thermostat contacts causing the contacts of the motor relay to rapidly open and close several times in a short period of time. Since the relay contacts carry relatively high current, particularly during starting of the compressor motor, the heat and arcing generated by chattering of the contacts can be sufficient to cause them to weld shut or to severely burn them and impair the operation of the relay.

Various proposals have been suggested to overcome the contact chatter problem. For example, it has been proposed to provide a time delay subsequent to closing of the thermostat contacts before the motor relay contacts close. This solution may be ineffective because it will only protect against initial bouncing of the thermostat contacts, but is unable to protect against subsequent vibration of the contacts. An additional disadvantage of this arrangement is that the timing mechanism required, such as a timer motor, is expensive.

One attempt to reduce the expense involved in providing thermostat chatter time delay is to use a timer which is provided to prevent restart of the refrigeration system after an excessive motor current condition is experienced. Unfortunately, this arrangement usually provides an excessively long time delay before cooling can be obtained after the thermostat contacts are closed or opened depending on which condition initiates the timing cycle. Also, any slight chatter will deactivate the refrigeration system even through it is too trivial to injure the relay contacts.

Accordingly, it is a principal object of this invention to provide an improved refrigerant compressor motor protection and control system which includes means for protecting against damage to the relay contacts due to thermostat chatter by using an integrated function of the actual voltage across the open thermostat contacts to positively trip a circuit which deenergizes the motor relay.

SUMMARY OF THE INVENTION

In accordance with this invention, the compressor motor relay is energized and de-energized by a switch which is controlled by a plurality of trip circuits. A first trip circuit is controlled by any suitable overload function such as the difference between a motor current signal and a reset signal. A second trip circuit is controlled by the output of an integrator which integrates the voltage across the thermostat contacts in their open condition. Whenever the thermostat contacts open for an excessive period of time, for example, due to vibration, the second trip circuit positively actuates the switch to its nonconducting condition in response to an integrated function of the voltage across the contacts, thereby de-energizing the compressor motor relay and disconnecting the compressor motor from the line current source. However, an insignificant amount of chatter will not cause a nuisance trip of the control because the output of the integrator remains too low to trip the circuit. When the switch means is actuated to its nonconducting condition, a feedback circuit causes a trip of the first trip circuit. Thereafter some time interval must elapse for the reset signal to reset the first trip circuit so that the switch can again be actuated to its conducting condition.

An advantage of the system in accordance with this invention is that the time delay required to re-energize the compressor motor due to chattering of the thermostat contacts may be made substantially less than the time delay necessary to reset the system in the event of a motor current overlaod.

DESCRIPTION OF THE PREFERRED EMBODIMENT

Figure 1:
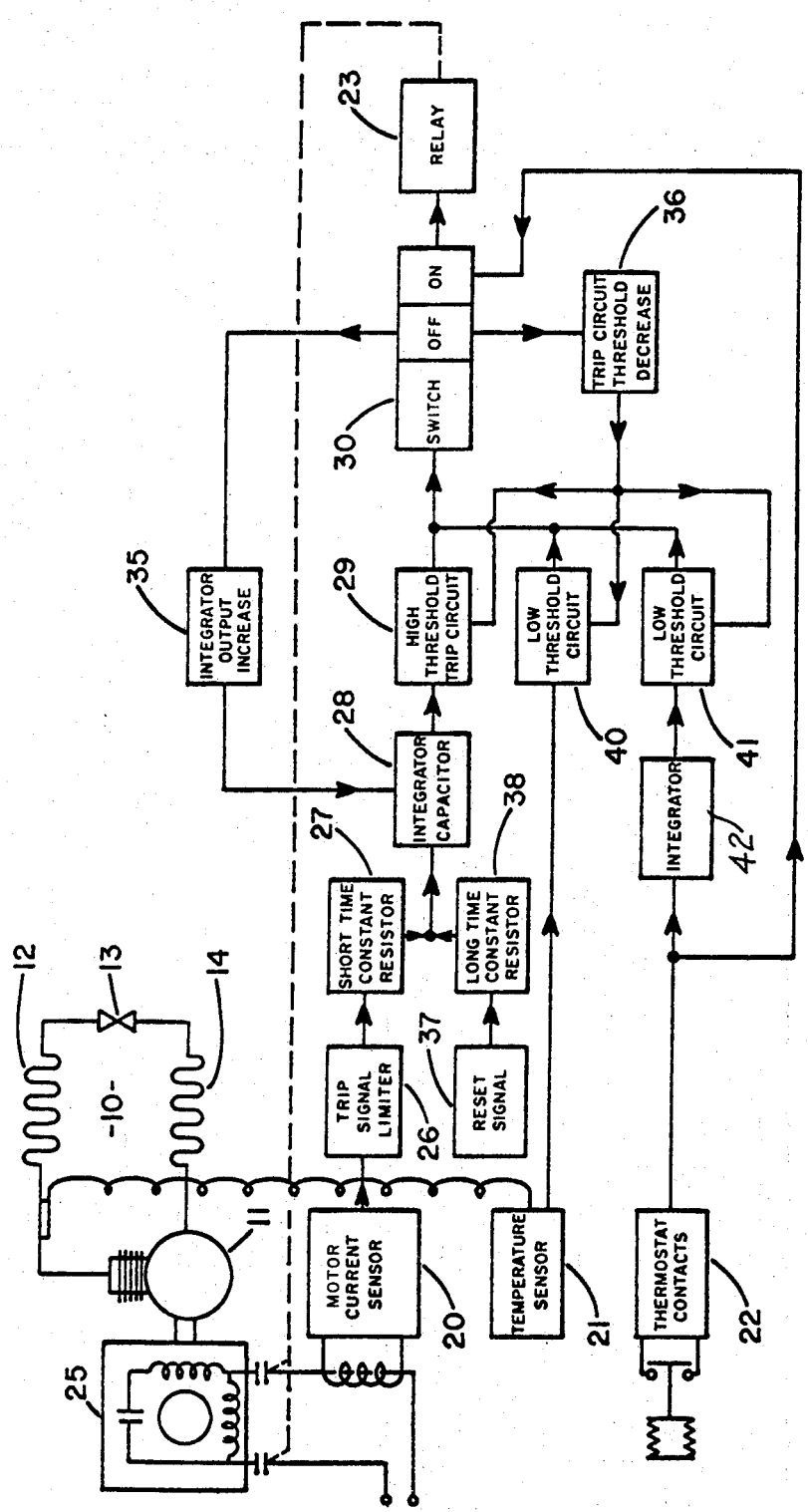
FIG. 1 is a schematic illustration of a reciprocating refrigeration system having a motor protection and control system illustrated in block diagram form.

A refrigeration system 10 comprising a reciprocating compressor 11, a condenser 12, an expansion device 13 and an evaporator 14 is driven by an electric motor 25. While for purposes of illustration a simple reciprocating refrigeration system is shown, it will be appreciated that the motor protection and control system of this invention may be employed in various single or multiple phase electric motor driven systems.

The basic operation of the motor protection system will be described with reference to the block diagram in FIG. 1. A motor current sensor 20 which is preferably a current transformer in the common lead of the compressor motor provides a signal output proportional to the motor current and thereby is capable of providing an indication of a motor overload. The signal from the current sensor is passed through trip signal limiter 26 and through a short time constant resistor 27 to an integrator capacitor 28. The trip signal limiter limits the magnitude of the overload signal at some high value, indicating a locked rotor or other serious motor overload condition, so that various motors having somewhat different maximum locked rotor currents will each provide a similar magnitude signal to the integrator and it will be unnecessary to make circuit adjustments to accommodate differing locked rotor currents of various motors.

A second signal of opposite current polarity is also supplied to integrator capacitor 28 from reset signal source 37. The two signals are effectively summed to provide a signal to the integrator capacitor which is a function of the difference between the motor current signal and the reset signal. If the reset signal is equal to or larger than the motor current signal, trip circuit 29 will remain in the set state and not affect the system. If the motor current signal is sufficiently greater than the reset signal, the integrator voltage output will eventually reach the tip threshold level of trip circuit 28 unless the over current condition corrects itself first.

After the signal from integrator 28 has reached the threshold of high threshold trip circuit 29, this circuit will activate switch 30 to the off condition which de-energizes relay 23 and compressor motor 25. The length of time required to de-energize motor 25 under locked rotor conditions will depend on the time constant determined by resistor circuit 27 and may typically be on the order of about 1¼ seconds. If a smaller motor overload less than the limiting level of limiter 26 is experienced, integrator 28 will not reach the trip level of circuit 29 for a somewhat longer period of time due to the integration function, thereby allowing the motor more time to attempt to start. Since the lower motor current produces less heat, it will be apparent that a greater on time before trip is desirable under relatively light overload conditions.

When switch 30 is actuated to its off state, a regenerative feedback signal is fed through circuit 35 to integrator 28 which increases the signal output from the integrator. Similarly, a second feedback signal is provided from switch 30 when it is in the off state through circuit 36 to decrease the threshold of trip circuit 29. This signal is also in effect a regenerative feedback which causes high threshold trip circuit 29 to have a lower reset level from that existing prior to the trip.

Switch 30 will remain in the off condition for some preselected period of time which may by typically on the order of five minutes. Since there is no motor current signal, the off period if solely governed by the time required for reset signal 37 passing through long time constant resistor 38 to be integrated by integrator capacitor 28 and achieve an integrator output level corresponding to the reset level established for high threshold trip circuit 29. When this occurs, the high threshold trip circuit is deactivated, thereby switching switch 30 to its on condition. The on condition of switch 30 enables relay 23 to be energized by a current passing through thermostat contacts 22, from a transformer or other suitable source, provided that the thermostat contacts are closed. When the thermostat contacts open, the current to relay 23 is interrupted, thereby stopping compressor motor 25.

A temperature sensor 21, which may sense various conditions, is preferably attached to the compressed gas discharge line from the compressor and provides a signal to low threshold trip circuit 40 to protect against abnormal conditions in the refrigeration system such as slow loss of refrigerant. When temperature sensor 21 senses an excessive gas discharge temperature, its output causes low threshold trip circuit 40 to activate switch 30 to the off condition, thereby de-energizing motor 25. When switch 30 is activated to the off condition, feedback circuits 35, 36, previously described, raise the output of integrator 28 and decrease the trip threshold sufficiently to trip high threshold trip circuit 29. Consequently, all of the trip circuits have a reset level lower than their initial trip levels. Switch 30 will thereafter again be activated to the on condition, assuming all sensors are below the trip level, after a time delay determined by resistor 38 and integrator capacitor 28.

Thermostat contacts 22 are connected to a source of low voltage alternating current such as a transformer (not shown) connected to terminals 90, 91. Contacts 22 open, when cooling is not required, and the AC signal across them is transmitted through integrator 42 to low threshold trip circuit 41 which actuates switch 30 to an off condition after a short time delay sufficient to prevent nuisance trips but short enough to prevent contactor damage. Contacts 22 close when calling for cooling and the low voltage alternating current is enabled to pass through contacts 22 and switch 30 to relay 23 and actuate compressor motor 25.

After a trip occurs due to any of the inputs to the circuit, a reset signal 37 passes through long time constant resistor 38 to integrator 28 so that the circuit will be reset after a predetermined period of time, providing the inputs are below the reset level. However, a trip due to the thermostat contacts opening normally will not require as long a reset time as a trip due to motor over current because of the initially lower integrator output at the time of trip.

Figure 2:
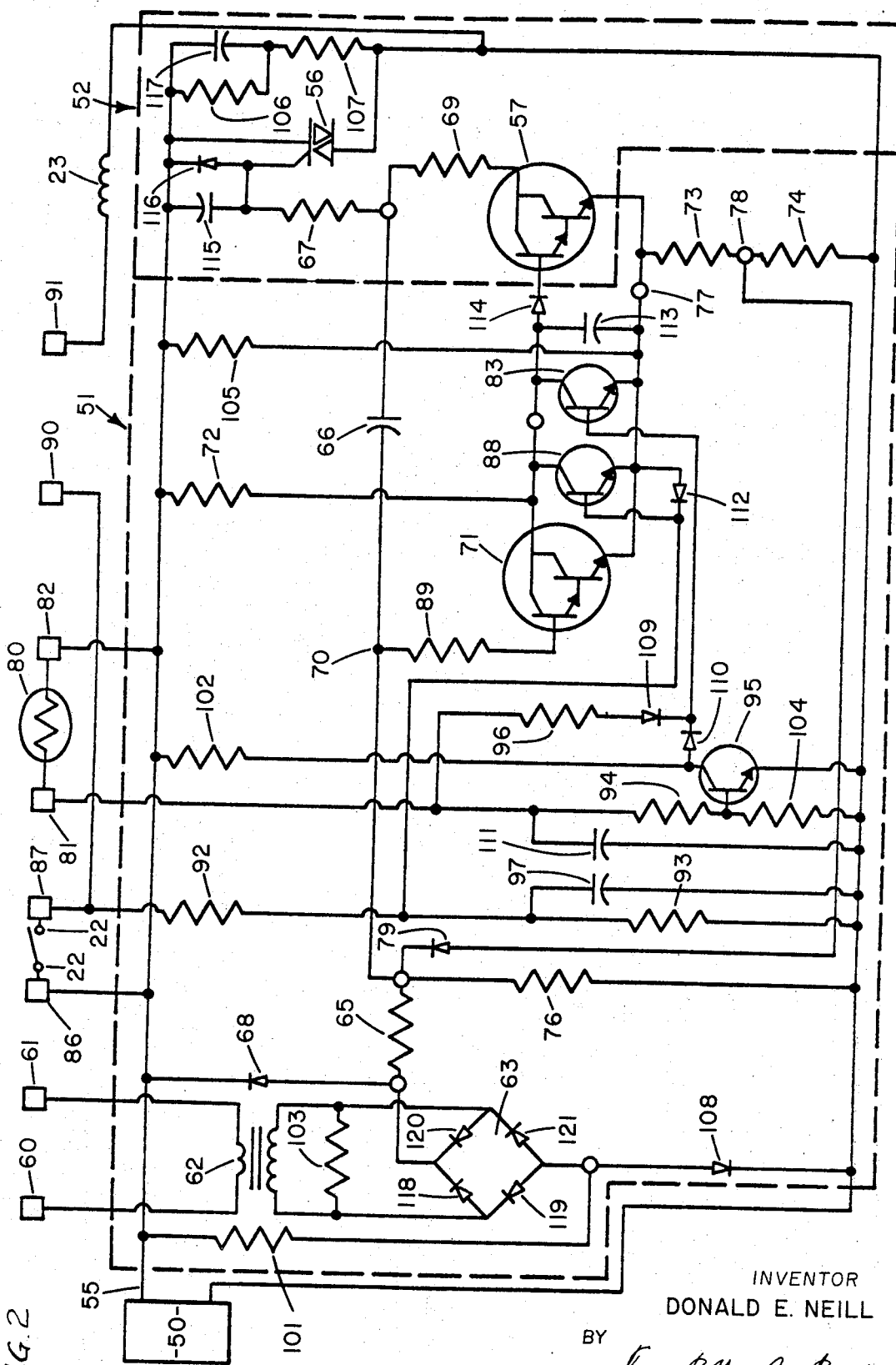
FIG. 2 is a schematic illustration of a suitable electronic circuit for a motor control system in accordance with this invention.

Referring particularly to FIG. 2, the actual circuit consists of a power supply 50, a trip circuit 51 and a switch circuit 52. Power supply 50 simply provides a regulated B+ voltage at terminal 55 and need not be specifically described since any conventional power supply circuit may be utilized.

Switch circuit 52 comprises a Triac 56 or other semiconductor switch in series with the contactor coil of relay 23. Switching of Triac 56 is controlled by a Darlington transistor pair 57 which is actuated by the current input to its base.

The trip and timing circuit 51 includes the input signal circuits, reset signal circuitry, integration circuitry and the trip and feedback circuits previously discussed.

Terminals 60 and 61 are preferably in series with the common lead of the motor windings. Current transformer 62 along with shunt resistor 103 provides a voltage to bridge rectifier 63. The output of the rectifier bridge provides a signal through resistor 65 which tends to discharge capacitor 66 which is connected through resistor 67 and the gate circuit of Triac 56 to the B+ supply voltage. Capacitor 66 performs the integration function of block 27. A diode 68 limits the peak voltage output of the rectifier bridge circuit to a voltage slightly above the B+ supply and performs the trip signal limiting function designated by block 26. Resistor 65 in combination with integrator capacitor 66 forms a short time constant circuit which determines the time required to discharge capacitor 66 sufficiently to cause a trip of the switch circuitry.

When the level of signal at input terminal 70, which is connected to the base of Darlington pair 71 through resistor 89, reaches a predetermined positive voltage due to discharge of capacitor 66 through resistor 65, the Darlington pair becomes conductive and causes current to flow through resistor 72, the collector-emitter circuit of pair 71, and resistors 73, 74. The current flow through pair 71 reduces the base to emitter voltage across pair 57 causing it to turn off. When pair 71 turns on and pair 57 turns off, gate current no longer flows from Triac 56 through resistors 67, 69 and pair 57, so the Triac assumes a nonconducting condition which de-energizes relay 23, opens contacts 75 and de-energizes motor 25.

It will be seen that pair 71 corresponds to the high threshold trip circuit 29 previously described. The preferred circuit uses a high gain trip circuit stage for the motor current trip input, but it will be understood that this high threshold trip circuit could be replaced with a low threshold trip circuit or one using a single input transistor if desired.

When pair 57 is turned off, relatively little current flows from the gate circuit of Triac 56 and the voltage drop across resistor 67 is reduced. Since capacitor 66 is connected to one terminal of resistor 67, its positive terminal rises to a more positive voltage which, in effect, momentarily increases output of the integrator at input 70 by raising this point to a higher positive voltage, thereby tending to drive pair 71 into further conduction as diagrammatically illustrated by block 35 of FIG. 1. A second feedback effect is provided when pair 57 is turned off because the reduced current through resistors 73, 74 causes the emitter of pair 71 to drop to a more negative voltage, thereby reducing the voltage threshold required to trigger pair 71 to a conducting state. By dropping the emitter voltage of pair 71, it will be apparent that the signal level required to turn pair 71 off is lower than the level required to initially turn it on, or in other words, a reset level has been provided which is lower than the trip level as diagrammatically illustrated by block 36.

After switch circuit 52 has been actuated to a nonconducting state, capacitor 66 will slowly charge through resistor 76 which corresponds to long time constant block 38. Eventually, input terminal 70 of capacitor 66 will charge to a more negative voltage than that of the reset potential established for pair 71. As the base of pair 71 becomes more negative, this pair becomes nonconducting, and the voltage on the collector of pair 71 and the base of pair 57 rises so that pair 57 becomes conducting again. At the same time, the larger emitter current flow through pair 57 and resistors 73, 74 causes the voltage at conductor 77 to be more positive, thereby driving pair 71 off and pair 57 further into conduction. At the same time, pair 71 is driven further into a nonconducting state because the voltage drop across resistor 67 increases due to the current flow, from the gate of Triac 56, which has the effect of making the voltage on capacitor 66 and at input terminal 70 more negative. As the voltage at terminal 70 becomes more negative and the voltage at point 78 becomes more positive, diode 79 becomes forward biased and capacitor 66 partially discharges rapidly therethrough. The discharge of capacitor 66 through diode 79 during reset acsures that a proper reset time delay will be required after a thermostat related trip.

Thermistor 80 is connected across contacts 81, 82 to provide a signal input to transistor 83 which functions as low threshold trip circuit block 40. Similarly, thermostat contacts 86, 87 are connected to provide a signal to transistor 88 which functions as low threshold trip circuit block 41 previously described.

If the temperature of thermistor 80 is low (high resistance) and thermostat contacts 81, 82 are closed, neither transistor 83 or 88 will be conducting. Under these conditions, assuming low or no motor current, relay 23 can be energized by a suitable low voltage current source connected to the thermostat terminals 90, 91. This current flows from terminal 91 through the relay solenoid 23, Triac 56 and thermostat contacts 22, to terminal 90. If the temperature of thermistor 80 is sufficiently high or if the thermostat contacts are open, a positive voltage will appear on the base of transistors 83 or 88 respectively, which will cause switch circuit 52 to become nonconducting thereby increasing the integrator output, reducing the trip threshold to the reset value as previously described and tripping pair 71. It will be noted that it is necessary for each of the sensor inputs to be below the reset level before the switch circuit can thereafter be activated to an on condition. It is also necessary for a minimum time delay determined by the charging rate of capacitor 66 through resistor 76 to expire before the compressor motor can be again energized.

While a relatively long time delay of about five minutes must expire in the event that a motor over current condition has tripped pair 71, only a shorter period of time need expire in the event that the circuit is tripped by either transistors 83 or 88. This is because a trip due to an over current condition will discharge the voltage across capacitor 66 to an extent providing a high positive voltage at input 70 which is above the trip level and the capacitor must charge from resistor 76 through this large voltage increment before the base of pair 71 is driven sufficiently negative to reach the reset level. However, in the event the circuit was tripped due to an over temperature condition or thermostat contacts opening, capacitor 66 will most likely have a larger voltage across it at the time of trip and need charge only through a lesser voltage difference before pair 71 reaches the reset level. Capacitor 66 determines both the on time for a current related trip and off periods for the entire circuit in the event of a trip.

Typical component values are given in the following table:

| Semiconductors | | RESISTORS | | Capacitors | |
| --- | --- | --- | --- | --- | --- |
| Ref. No. | Part No. | Ref. No. | Value | Ref. No. | Value |
| 108 | IN4148 | 101 | 3.3K | 97 | 0.01μf |
| 118 | IN4148 | 103 | 665 ohm± | 111 | 0.01μf |
| 119 | IN4148 | 65 | 6.2K | 115 | 0.1μf |
| 120 | IN4148 | 76 | 1.8M | 117 | 0.05μf |
| 121 | IN4148 | 92 | 120K | 66 | 220μf |
| 79 | IN4148 | 93 | 43K | 113 | 1.0μf |
| 110 | IN4148 | 94 | 1.2K | | |
| 109 | IN4148 | 104 | 820K | | |
| 112 | IN4148 | 102 | 330K | | |
| 114 | IN4148 | 96 | 15K | | |
| 116 | IN270 | 89 | 4.7M | | |
| 68 | IN4148 | 72 | 33K | | |
| 71 | 2N5306 | 73 | 72 | | |
| 88 | 2N5172 | 74 | 118 | | |
| 83 | SPS2366 | 105 | 442 | | |
| 57 | SPS6613 | 69 | 76.8 ohm | | |
| 95 | 2N5088 | 67 | 110 | | |
| Triac 56 | RCA-61104 | 106 | 68K | | |
| | | 107 | 100 | | |

The operation of the motor protection system will be apparent from the foregoing description. The thermostat is connected to a suitable source of current such as a transformer connected to terminals 90, 91. Normally, the thermostat contacts closing will assure that the compressor motor relay will be energized by the current source, provided Triac 56 is conducting.

When the thermostat contacts open, current is no longer supplied through Triac 56 from the thermostat to energize relay 23 so the relay contacts open and motor 11 stops. In addition, the presence of the open thermostat contacts results in a voltage on the base of transistor 88 which turns on transistor 88 after a short time delay provided by capacitor 97 and causes pair 57 and Triac 56 to turn off. This action, in turn, results in a feedback response which raises the output of the integrator capacitor 66 and reduces the trip threshold of the current and temperature responsive trip circuits. Raising the integrator output along with lowering the trip threshold of the current trip circuit trips pair 71 to the conducting state and imposes a typically short time delay on the circuit achieving the reset state.

A short time delay will be provided by integrator circuit 42 comprising resistors 92, 93 and capacitor 97 before the open circuit thermostat voltage can be integrated to the trip level of transistor 88. Typically, this time delay will be on the order of 2–12 milliseconds depending on the phase of the AC signal across the thermostat contacts at the time they open. This time delay may be made as long as desired for the particular system so that a few short thermostat contact bounces will not result in an unnecessary nuisance trip of the system. However, the time delay is selected so that excessive thermostat chatter which could damage the relay contacts will not be permitted without tripping the circuit.

The time delay to reset the system due to opening of the thermostat contacts will normally be much less than that imposed on the system due to an over current trip because the output of the integration circuit is much lower (less positive) at the time of the initial trip. Consequently, the circuit uses the same timing circuit but is able to discriminate between a normal and abnormal trip and provides a shorter time delay in the former instance.

It will also be observed that momentary opening of the thermostat contacts due to thermostat chatter will not trip the circuit until after the short period of time required for integrator 42 to integrate the open circuit voltage signal from the thermostat to the trip value of circuit 41 which includes transistor 88. This permits a period of nominally about 2 to 12 milliseconds to elapse during which the thermostate can briefly chatter without requiring the system to reset before the compressor can be started again. The period of time required to integrate the open contact signal is selected to be sufficiently short that no serious damage will be done due to chattering of the relay contacts. Consequently, a short thermostat contact bounce will not result in a nuisance trip of the system. If the thermostat continues to chatter or remain open at the end of that period of time, the circuit will trip and provide a reset time before another attempt at starting the compressor can be made.

The system described utilizes an external power source such as a transformer for energizing relay 23 through the thermostat contacts. However, if desired, switch 30 can directly energize relay 23 utilizing the power supply voltage for the compressor protection system and the thermostat contacts would merely control the trip circuit in a desired manner. The illustrated circuit attempts to minimize the number of discrete components required to reduce the cost, but it will be apparent that an integrated circuit version of the control using similar control logic may be desired.

The circuit herein described effectively prevents damage to the motor relay contacts due to chattering and also limits the number of times they can cycle over a given period of time by providing a selected reset time delay in response to the occurrence of an open circuit voltage across the thermostat contacts for the period of time required to integrate it to the trip level. At the same time, minor thermostat chatter does not cause nuisance trips until it becomes significant enough to represent a danger of relay contactor damage.

While a preferred embodiment of this invention has been described for purposes of illustration, it will be appreciated that the invention may be otherwise embodied within the scope of the following claims.

I claim:

1. A motor control system for governing the operation of the compressor motor of a refrigeration system; said control system comprising:
   A. a relay having electrical contacts for connecting and disconnecting a compressor motor with a source of electric current;
   B. solid state switch means controlling the energizing and de-energizing of said relay;
   C. a first trip circuit having a trip level for rendering said switch means nonconducting in response to an input signal of a predetermined magnitude being supplied thereto;
   D. reset time delay means connected to enable the system to energize said relay means and motor after a period of time has elapsed following a trip due to said first trip circuit;
   E. a second trip circuit having a trip level for rendering said switch means nonconducting in response to an input signal of a predetermined magnitude being supplied thereto;
   F. thermostat terminal means for connecting a thermostat to said system having a pair of electrical thermostat contacts for supplying a refrigeration demand signal to energize said relay means upon closing of the thermostat contacts due to the occurrence of a refrigeration demand; and
   G. integration circuit means connected to said thermostat terminal means for integrating an input signal which is functionally related to the presence of an open circuit voltage appearing across said thermostat terminal means upon opening of thermostat contacts connected thereto, said integration circuit means providing an integrated output signal to said second trip circuit, whereby said second trip circuit is tripped and said motor relay is positively de-energized after the interval of time required to integrate the input signal to the trip level of said second trip circuit, to thereby prevent damage to the relay contacts upon opening or excessive chattering of the thermostat contacts.

2. A control system as defined in claim 1, including feedback circuit means associated with said switch means for tripping said first trip circuit when the second trip circuit is tripped so that a reset time delay associated with resetting of the first trip circuit is imposed on re-energizing said relay means in the event of tripping of said second trip circuit.

3. A control system as defined in claim 1, wherein said reset time delay means includes circuit means for providing a reset signal and means for supplying the reset signal to an integration means whereby the system is reset a period of time subsequent to a trip which is determined by the length of time required to integrate a function of the reset signal to the reset level of the system.

4. A control system as defined in claim 1, including motor current sensing means connected to provide a motor current signal responsive to the magnitude of current drawn by the compressor motor, said reset time delay means including circuit means for providing a reset signal; circuit means for combining and integrating a difference between said motor current signal and said reset signal, and circuit means for providing the resulting integrated difference signal to said first trip circuit to trip said first trip circuit and de-energize said relay after the period of time required to integrate the difference function to the trip level, whereby relatively large motor current overloads cause a trip in a shorter period of time than relatively smaller motor current overloads.

5. A control system as defined in claim 1, including motor current sensing means connected to provide a motor current signal responsive to the magnitude of current drawn by the compressor motor; said reset time delay means including circuit means for providing a reset signal; circuit means for combining and integrating a difference between said motor current signal and said reset signal, and circuit means for providing the resulting integrated difference signal to said first trip circuit; and said system including feedback circuit means associated with said switch means for tripping said first trip circuit when the second trip circuit is tripped so that reset time delay associated with resetting of the first trip circuit is imposed on re-energizing said relay means in the event of tripping said second trip circuit.

* * * * *